(12) United States Patent
Krämer et al.

(10) Patent No.: US 11,331,973 B2
(45) Date of Patent: May 17, 2022

(54) SUSPENSION CONTROL APPARATUS

(71) Applicant: Hitachi Astemo, Ltd., Ibaraki (JP)

(72) Inventors: Manfred Krämer, Schwaig-Oberding (DE); Timo Arnold, Schwaig-Oberding (DE); Joachim Funke, Schwaig-Oberding (DE); Matthias Bruns, Schwaig-Oberding (DE)

(73) Assignee: HITACHI ASTEMO, LTD., Ibaraki (JP)

( * ) Notice: Subject to any disclaimer, the term of this patent is extended or adjusted under 35 U.S.C. 154(b) by 0 days.

(21) Appl. No.: 16/626,994

(22) PCT Filed: Jun. 13, 2018

(86) PCT No.: PCT/JP2018/022505
§ 371 (c)(1),
(2) Date: Dec. 27, 2019

(87) PCT Pub. No.: WO2019/003906
PCT Pub. Date: Jan. 3, 2019

(65) Prior Publication Data
US 2020/0139780 A1    May 7, 2020

(30) Foreign Application Priority Data

Jun. 28, 2017 (JP) .............................. JP2017-126113

(51) Int. Cl.
*F16F 9/53* (2006.01)
*B60G 17/015* (2006.01)
(Continued)

(52) U.S. Cl.
CPC ......... *B60G 17/0152* (2013.01); *B60G 17/08* (2013.01); *F16F 9/185* (2013.01);
(Continued)

(58) Field of Classification Search
CPC ...... F16F 9/185; F16F 9/532; B60G 17/0152; B60G 17/018; B60G 17/08
(Continued)

(56) References Cited

U.S. PATENT DOCUMENTS

| 5,000,299 A * | 3/1991 | Goto ................. C10M 171/001 188/267.1 |
| 5,133,574 A * | 7/1992 | Yamaoka ......... B60G 17/01941 280/5.519 |

(Continued)

FOREIGN PATENT DOCUMENTS

| JP | 58-206444 | 12/1983 |
| JP | 3-145919 | 6/1991 |

(Continued)

OTHER PUBLICATIONS

International Search Report dated Aug. 7, 2018 in International (PCT) Application No. PCT/JP2018/022505 with English-language translation.
(Continued)

*Primary Examiner* — Christopher P Schwartz
(74) *Attorney, Agent, or Firm* — Wenderoth, Lind & Ponack, L.L.P.

(57) ABSTRACT

A voltage converter of a high voltage driver generates a high voltage applied to an electrorheological damper. The voltage converter and the electrorheological damper are electrically connected together through a connecting portion. The connecting portion comprises an electrode pin that connects the voltage converter and an electrode cylinder of the electrorheological damper; a ground pin that connects an external cylinder of the electrorheological damper and ground, and a ground detection pin disposed separately from the ground pin and connected to the ground through the external cylinder and the ground pin. When the ground detection pin and the ground are disconnected, the voltage converter
(Continued)

discontinues the voltage generation with or without a command (control signal) of a sub-controller.

4 Claims, 4 Drawing Sheets

(51) Int. Cl.
    *B60G 17/08*     (2006.01)
    *F16F 9/18*     (2006.01)

(52) U.S. Cl.
    CPC .......... *F16F 9/532* (2013.01); *B60G 2202/24* (2013.01); *B60G 2206/41* (2013.01); *B60G 2500/10* (2013.01); *B60G 2600/182* (2013.01); *B60G 2600/21* (2013.01); *B60G 2600/73* (2013.01); *F16F 2222/12* (2013.01); *F16F 2228/066* (2013.01); *F16F 2230/18* (2013.01)

(58) Field of Classification Search
    USPC .................. 188/266.7, 267.1, 267.2, 322.19; 280/5.519
    See application file for complete search history.

(56) References Cited

U.S. PATENT DOCUMENTS

| | | | | |
|---|---|---|---|---|
| 5,142,477 A | * | 8/1992 | Tsutsumi | B60G 17/0165 |
| | | | | 280/5.515 |
| 5,166,852 A | | 11/1992 | Sano | |
| 5,259,487 A | * | 11/1993 | Petek | F16F 9/532 |
| | | | | 188/267.1 |
| 5,489,009 A | * | 2/1996 | Kawamata | F16F 9/103 |
| | | | | 188/267.1 |
| 2018/0319241 A1 | * | 11/2018 | Hirao | F16F 9/532 |
| 2021/0010560 A1 | * | 1/2021 | Kusukawa | F16F 9/532 |

FOREIGN PATENT DOCUMENTS

| | | |
|---|---|---|
| JP | 10-2368 | 1/1998 |
| WO | 2017/002620 | 1/2017 |

OTHER PUBLICATIONS

International Preliminary Report on Patentability dated Aug. 7, 2018 in International (PCT) Application No. PCT/JP2018/022505 with English-language translation.

* cited by examiner

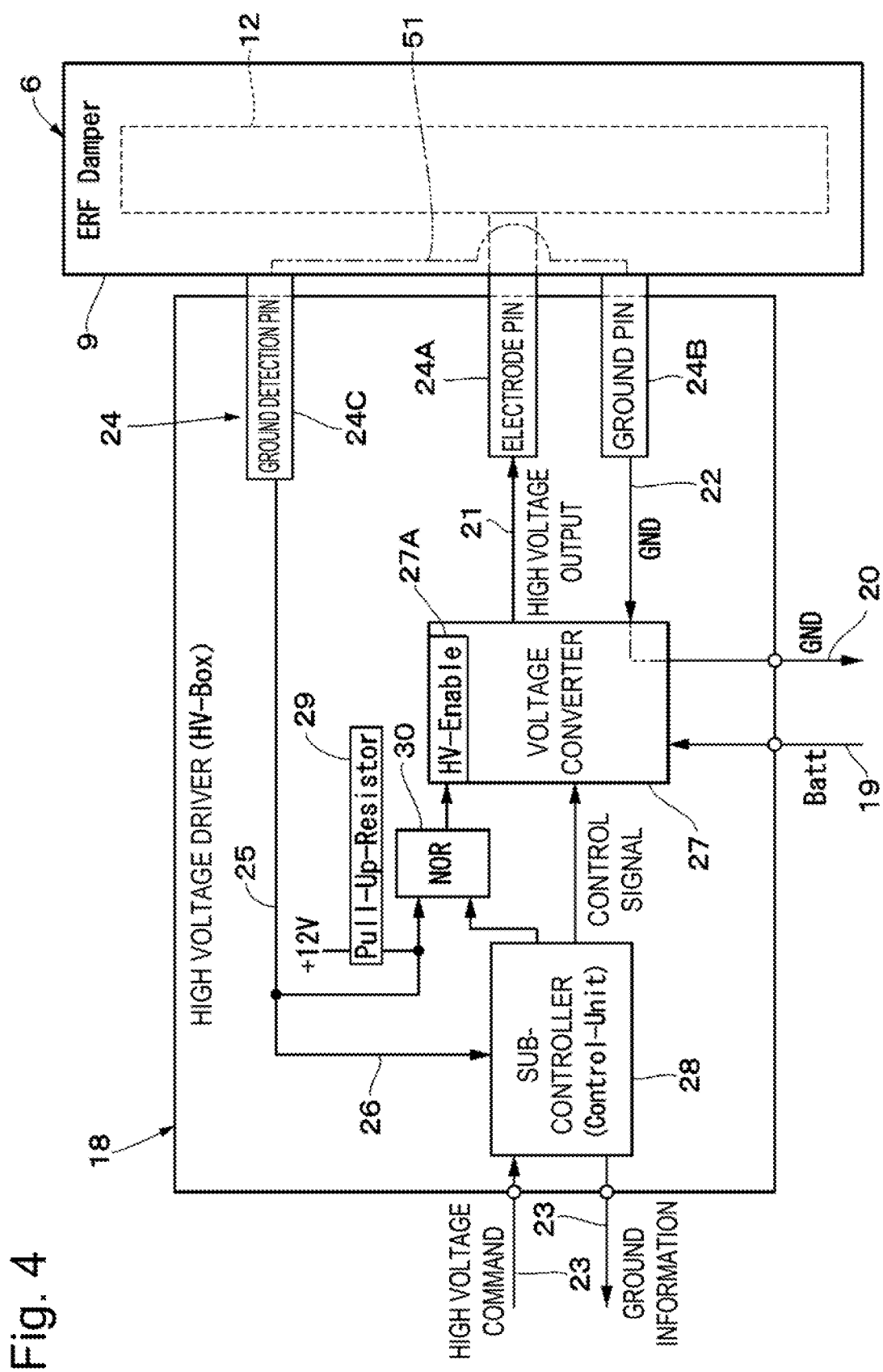

SUSPENSION CONTROL APPARATUS

TECHNICAL FIELD

The invention relates to a suspension control apparatus installed in a vehicle, such as an automobile.

BACKGROUND ART

A vehicle, such as an automobile, is provided with a shock absorber (damper) between a vehicle body (sprung) side and a wheel (unsprung) side. Patent Literature 1, for example, describes an electrorheological damper using an electrorheological fluid as a hydraulic fluid.

CITATION LIST

Patent Literature

PTL 1: Japanese Patent Application Publication (Kokai) No. 10-2368

SUMMARY OF INVENTION

Technical Problem

The electrode of the electrorheological damper is applied with a high voltage. It is therefore unfavorable that the electrode of the electrorheological damper is applied with the high voltage, for example, while the cylinder of the electrorheological damper is ungrounded (unconnected to ground).

Solution to Problem

An object of the invention is to provide a suspension control apparatus capable of restraining an electrode of an electrorheological damper from being applied with a high voltage while a cylinder of the electrorheological damper is ungrounded.

The suspension control apparatus according to one embodiment of the invention is a suspension control apparatus including an electrorheological damper sealingly containing an electrorheological fluid that is varied in properties by electric field, the electrorheological damper being configured to adjust a damping force along with voltage application; a voltage generating portion configured to generate a voltage applied to the electrorheological damper; a connecting portion configured to connect the voltage generating portion and the electrorheological damper; and a controller configured to control the voltage generating portion. The electrorheological damper includes a cylinder sealingly containing the electrorheological fluid, a piston slidably inserted in the cylinder, a piston rod coupled to the piston and extending out of the cylinder, and an electrode disposed in a portion through which the electrorheological fluid flows due to a sliding motion of the piston in the cylinder, the electrode being configured to apply a voltage to the electrorheological fluid. The connecting portion includes an electrode connecting portion that connects the voltage generating portion and the electrode, a ground connecting portion that connects the cylinder and ground, and a ground detection connecting portion disposed separately from the ground connecting portion and connected to the ground through the cylinder and the ground connecting portion. The voltage generating portion is designed to discontinue the voltage generation with or without a command of the controller when the ground detection connecting portion and the ground are disconnected.

The suspension control apparatus according to the one embodiment of the invention is capable of restraining the electrode of the electrorheological damper from being applied with a high voltage while the cylinder of the electrorheological damper is ungrounded.

BRIEF DESCRIPTION OF DRAWINGS

FIG. 4 is a block diagram showing a high voltage driver illustrated in FIG. 1 together with the electrorheological damper (ERF Damper).

DESCRIPTION OF EMBODIMENTS

A suspension control apparatus according to an embodiment is explained below with reference to the attached drawings, taking as an example a case where the suspension control apparatus is installed in a four-wheeled vehicle.

Figure 1:
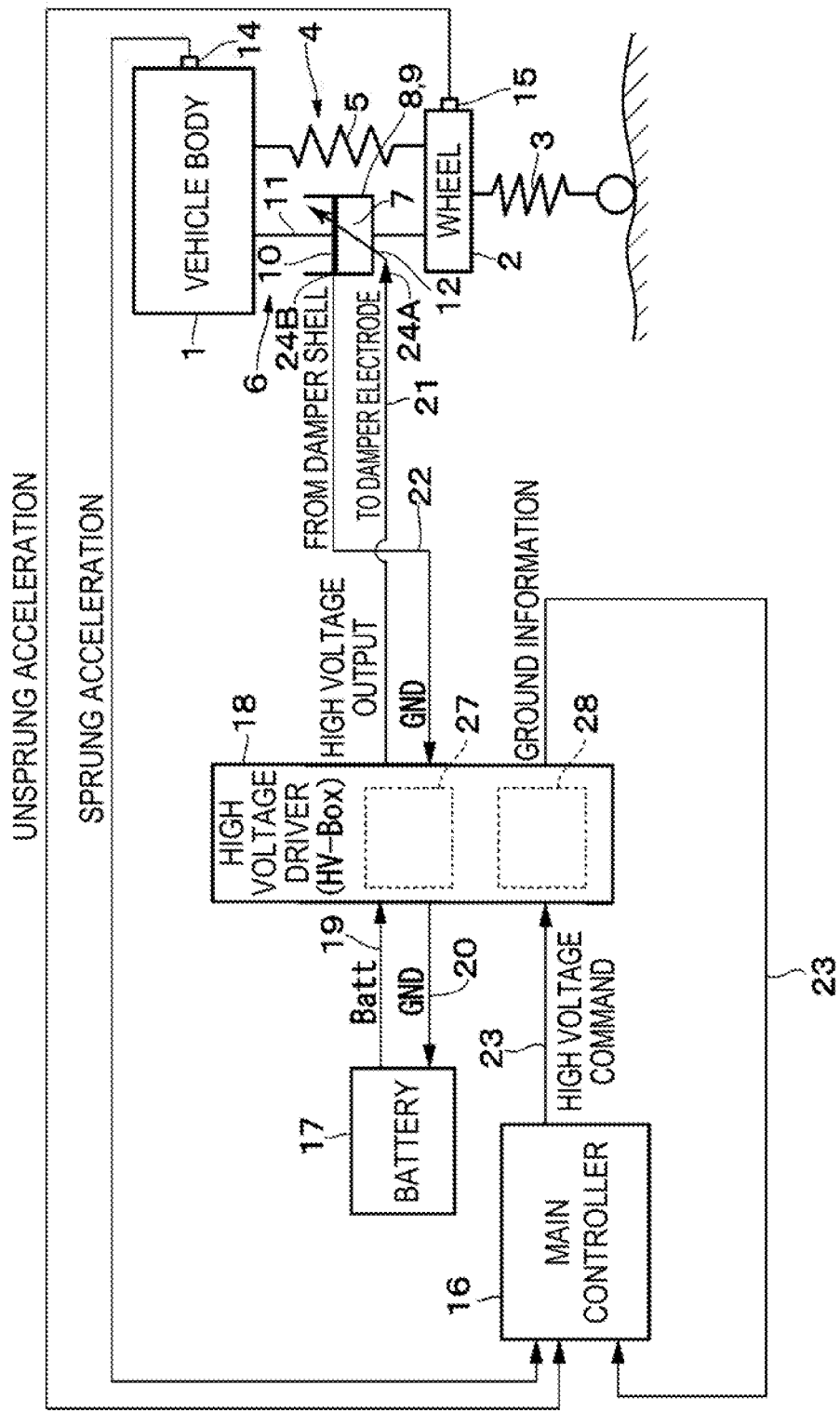
FIG. 1 is a diagram of a suspension control apparatus according to an embodiment.

Referring to FIG. 1, a vehicle body 1 forms a body of a vehicle. Disposed under the vehicle body 1 is a wheel that forms the vehicle together with the vehicle body 1. The wheel comprises, for example, left and right front wheels and left and right rear wheels (hereinafter, collectively referred to as a wheel 2). The wheel 2 comprises a tire 3. The tire 3 functions as a spring that absorbs small unevenness of a road surface.

A suspension device 4 is disposed between the vehicle body 1 and the wheel 2, that is, between two relatively displaceable members in the vehicle. The suspension device 4 comprises a suspension spring 5 (hereinafter, referred to as a spring 5) and a shock absorber 6 disposed in parallel with the spring 5 between the vehicle body 1 and the wheel 2, that is, between the two members. FIG. 1 exemplifies a case where the single suspension device 4 is disposed between the vehicle body 1 and the wheel 2. In fact, the suspension device 4 comprises, for example, four suspension devices disposed separately from each other between the wheel 2 comprising four wheels and the vehicle body 1 (disposed at four corners of the vehicle body 1). FIG. 1 schematically shows only one of the four suspension devices.

The shock absorber 6 of the suspension device 4 damps a vertical motion of the wheel 2. The shock absorber 6 is configured as a damping force adjustment shock absorber (semi-active damper), namely, an electrorheological damper (ERF Damper), using an electrorheological fluid (ERF: Electro Rheological Fluid) as a hydraulic oil (hydraulic fluid) sealingly contained inside the shock absorber 6. In such a case, the shock absorber 6 (hereinafter, referred to as an electrorheological damper 6) is supplied (applied) with electric power (voltage) by a battery 17 discussed later to adjust a damping force.

Figure 2:
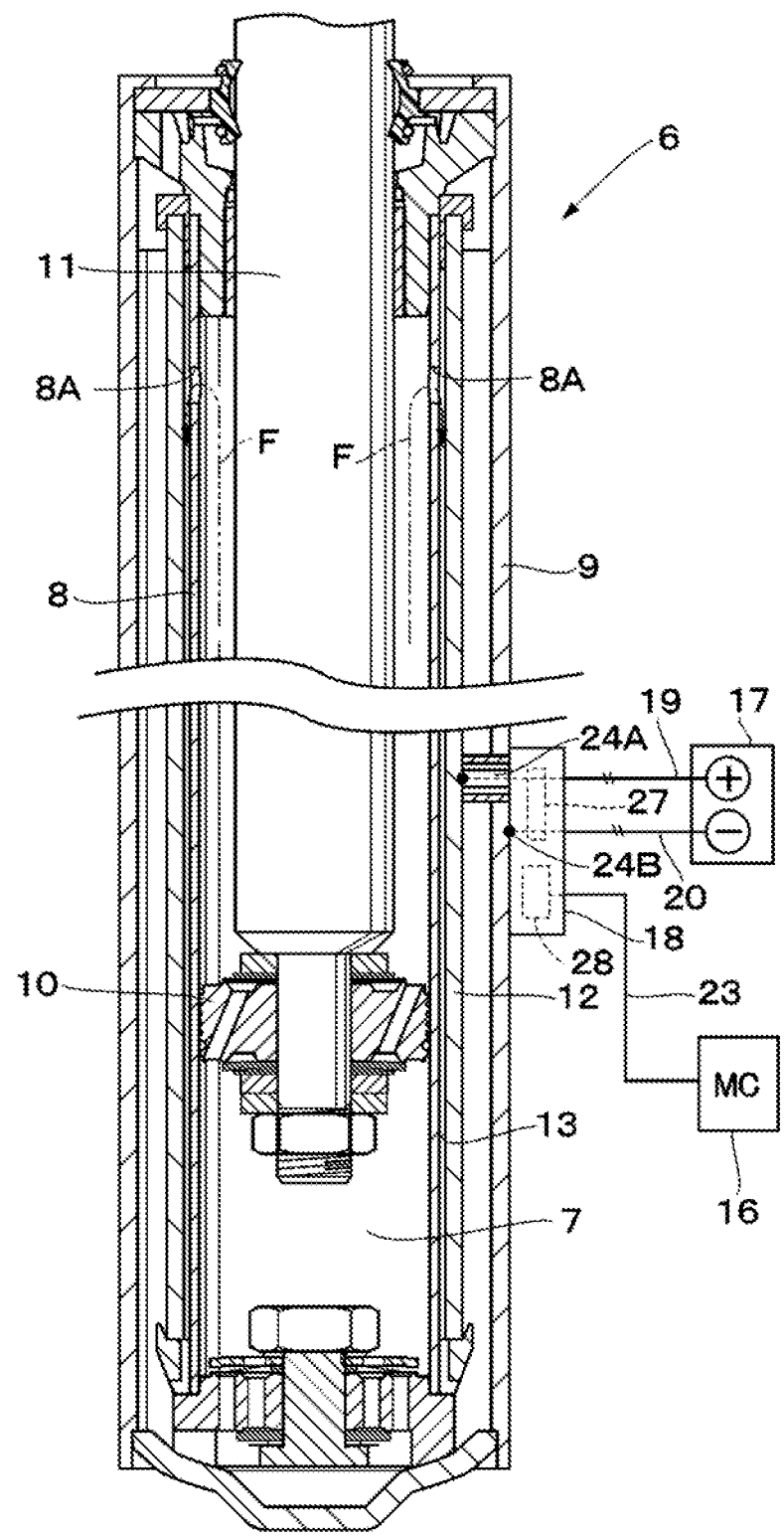
FIG. 2 is a longitudinal sectional view of an electrorheological damper illustrated in FIG. 1.

As illustrated in FIG. 2, the electrorheological damper 6 comprises an internal cylinder 8 and an external cylinder 9 as cylinders sealingly containing an electrorheological fluid 7 (hereinafter, referred to as an ERF 7), a piston 10 slidably inserted in the internal cylinder 8, a piston rod 11 coupled to the piston 10 and extending out of the internal cylinder 8 and the external cylinder 9, and an electrode cylinder 12 as an electrode disposed in a portion through which the ERF 7 flows due to a sliding motion of the piston 10 in the internal cylinder 8, the electrode cylinder 12 being configured to apply electric field to the ERF 7. The electrode cylinder 12 is applied with a control voltage (high voltage) through an electrode pin 24A discussed later. FIG. 2 shows the sealingly contained ERF 7 as being colorless and transparent.

The ERF 7 is a functional fluid that is varied in properties by the electric field (voltage). The ERF 7 comprises, for example, a base oil (base oil) including a silicon oil or the like, and particles (fine particles) which are mixed (dispersed) into the base oil and variable in viscosity with a change in the electric field. The ERF 7 is therefore varied in viscosity and then in flow resistance (damping force) according to an applied voltage. To be more specific, the electrorheological damper 6 is capable of adjusting characteristics of a generated damping force (damping force characteristics) from a hard (Hard) characteristic (thick characteristic) to a soft (Soft) characteristic (thin characteristic) in a continuous manner according to the voltage applied to the electrode cylinder 12 disposed in the portion through which the ERF 7 flows. The electrorheological damper 6 may be capable of adjusting the damping force characteristics through two or more stages, instead of the continuous manner.

The electrorheological damper 6 illustrated in FIG. 2 has a uniflow structure. The ERF 7 in the internal cylinder 8 therefore circulates in one direction from a fluid aperture 8A of the internal cylinder 8 toward an electrode path 13 (that is, a direction of arrows F shown by chain double-dashed lines in FIG. 2) in both compression and expansion strokes of the piston rod 11. The electrode cylinder 12 as an intermediate cylinder encloses the whole outer periphery of the internal cylinder 8, thereby forming the circular electrode path 13 between an inner periphery side of the electrode cylinder 12 and the outer periphery side of the internal cylinder 8. The electrode path 13 is a path through which the ERF 7 circulates. The ERF 7 flows in response to the sliding motion of the piston 10.

When the piston rod 11 moves back and forth in the internal cylinder 8 (that is, while the piston rod 11 repeats the compression and expansion strokes), the ERF 7 in the electrode path 13 flows in response to the forward and backward motion of the piston rod 11 in a direction from an upper end side toward a lower end side of the electrode path 13 in an axial direction. While the ERF 7 flows, potential difference corresponding to the voltage applied to the electrode cylinder 12 is generated in the electrode path 13, and the viscosity of the ERF 7 is varied. In other words, the electrorheological damper 6 generates the potential difference in the electrode path 13 formed between the internal cylinder 8 and the electrode cylinder 12 and thus controls the viscosity of the ERF 7 passing through the electrode path 13, to thereby control (adjust) the generated damping force.

As illustrated in FIG. 1, a sprung acceleration sensor 14 is disposed on the vehicle body 1 side of the vehicle. The sprung acceleration sensor 14 is attached to the vehicle 1, for example, at a position close to the electrorheological damper 6. The sprung acceleration sensor 14 detects vertical vibration acceleration at the vehicle body 1 side which is a so-called sprung side. The sprung acceleration sensor 14 then outputs a detection signal of the vertical vibration acceleration (namely, sprung acceleration) to a main controller 16.

Disposed on the wheel 2 side of the vehicle is an unsprung acceleration sensor 15. The unsprung acceleration sensor 15 detects the vertical vibration acceleration at the wheel 2 side which is a so-called unsprung side. The unsprung acceleration sensor 15 outputs a detection signal of the vertical vibration acceleration (namely, unsprung acceleration) to the main controller 16. At this time, the sprung acceleration sensor 14 and the unsprung acceleration sensor 15 form a vehicle behavior detection device (or more specifically, a vertical motion detection device) that detects vehicle behavior (or more specifically, a state quantity relating to a vertical motion of the vehicle).

The vehicle behavior detection device does not necessarily have to comprise the sprung acceleration sensor 14 and the unsprung acceleration sensor 15 which are disposed close to the electrorheological damper 6. The vehicle behavior detection device may comprise, for example, the sprung acceleration sensor 14 only or a vehicle height sensor, not shown. Furthermore, the vehicle behavior detection device may comprise a wheel speed sensor or the like, not shown, which detects rotating speed of the wheel 2 or may comprise a vehicle behavior detection sensor which detects the vehicle behavior (state quantity), instead of comprising the acceleration sensors 14 and 15 and the vehicle height sensor. In such a case, the vehicle behavior detection device may, for example, estimate the vertical motion with respect to each wheel 2 from information of the single sprung acceleration sensor 14 (acceleration) and information of the wheel speed sensor (wheel speed) and detect the vertical motion of the vehicle.

The main controller 16 is disposed in the vehicle body 1. The main controller 16 is a main controller for controlling the electrorheological damper 6 that is a damping force variable damper. In short, the main controller 16 is an ECU (Electronic Control Unit) for a suspension device. The main controller 16 is also called a main ECU (Main ECU) and comprises, for example, a microcomputer. In such a case, the main controller 16 includes a memory comprising a flash memory, a ROM, a RAM, an EEPROM, and the like and an arithmetic circuit (CPU). The memory stores a program used for control processing of the electrorheological damper 6 (for example, a processing program used to calculate the high voltage applied to the electrorheological damper 6 or other like programs).

The main controller 16 is connected to the acceleration sensors 14 and 15 and (a sub-controller 28 of) a high voltage driver 18. The signals outputted from the acceleration sensors 14 and 15, that is, acceleration signals corresponding to detection values of the acceleration sensors 14 and 15 are entered in the main controller 16. If necessary, ground information (ground signal) is entered in the main controller 16 from (the sub-controller 28 of) the high voltage driver 18. The ground information may include information (signal) as to whether the electrorheological damper 6 is grounded, or more specifically, information (signal) that the cylinder (external cylinder 9) of the electrorheological damper 6 and the ground (earth or body earth) are disconnected from each other. As discussed later, when the cylinder (external cylinder 9) of the electrorheological damper 6 and the ground are disconnected, (the sub-controller 28 of) the high voltage driver 18 outputs a signal indicating accordingly as the ground information.

The main controller 16 computes a necessary damping force on the basis of the detection values of the sprung acceleration sensor 14 and the unsprung acceleration sensor 15 and outputs a control signal. In other words, the main controller 16 computes (calculates) a high voltage command from the information obtained from the acceleration sensors 14 and 15. The high voltage command is a command outputted to (the sub-controller 28 of) the high voltage driver 18. More specifically, the main controller 16 computes the high voltage command corresponding to a force (damping force) to be outputted by the electrorheological damper 6 on the basis of the acceleration signals (acceleration), that is, vehicle behavior information (vehicle behavior signals).

The main controller 16 outputs to (the sub-controller 28 of) the high voltage driver 18 the control signal (high voltage command signal) corresponding to the computed high voltage command. Based on the control signal (high voltage command) outputted from the main controller 16, the high voltage driver 18 outputs (applies) the high voltage corresponding to the signal (command) to the electrode cylinder 12 of the electrorheological damper 6. In the electrorheological damper 6 to which the high voltage is entered (applied), the viscosity of the ERF 7 is varied according to a change of the voltage value (potential difference between the electrode cylinder 12 and the internal cylinder 8), and the damping force characteristics are switched (adjusted). When the ground information is entered from (the sub-controller 28 of) the high voltage driver 18 to the main controller 16, that is, when the signal indicating that the cylinder (external cylinder 9) of the electrorheological damper 6 and the ground are disconnected is entered in the main controller 16, the main controller 16 is allowed to set the high voltage command to zero.

The battery 17 functions as a power source for applying a voltage to the electrode cylinder 12 of the electrorheological damper 6. The battery 17 moreover functions as a power source of the main controller 16 and of the sub-controller 28 of the high voltage driver 18. The battery 17 (namely, the power source) comprises, for example, an in-vehicle battery of 12V which functions as a battery for auxiliaries of the vehicle (and an alternator that charges the in-vehicle battery as necessary).

The battery 17 is connected to the electrorheological damper 6 (the electrode cylinder 12 and the external cylinder 9 functioning as a damper shell) through the high voltage driver 18 that is also called a high voltage box (HV-Box). The power source (battery 17) of the electrorheological damper 6 may be, for example, a high-capacity battery, not shown, for driving a vehicle if the vehicle is a hybrid or electric vehicle in which an electric motor for running (driving motor) is installed.

The high voltage driver 18 comprises as many high voltage drivers 18 as the electrorheological damper 6 comprises electrorheological dampers 6 (for example, if the electrorheological damper 6 comprises four electrorheological dampers 6, the high voltage driver 18 comprises four high voltage drivers 18). In other words, the high voltage driver 18 is disposed in each of the electrorheological dampers 6 disposed in the vehicle body 1. In such a case, the high voltage driver 18 is mounted, for example, on (the external cylinder 9 of) the electrorheological damper 6. The high voltage driver 18 develops a high voltage applied to the ERF 7 of the electrorheological damper 6.

For the purpose of developing the high voltage, the high voltage driver 18 is connected to the battery 17 functioning as a power source through a battery cable (batt cable) 19 and a grounding cable (GND cable) 20 which form a (low-voltage) DC power line. The high voltage driver 18 is further connected to the electrorheological damper 6 (the electrode cylinder 12 and the external cylinder 9 functioning as a damper shell) through a high voltage output cable 21 and a grounding cable (GND cable) 22 which form a (high-voltage) DC power line. As illustrated in FIG. 2, the high voltage driver 18 is connected to the electrode cylinder 12 of the electrorheological damper 6 through an electrode pin 24A discussed later. The electrode pin 24A functions as an actuator that switches the damping force of the electrorheological damper 6. In other words, the damping force of the electrorheological damper 6 is switched (adjusted) on the basis of the control voltage supplied to the electrode pin 24A of the high voltage driver 18.

As discussed later, the high voltage driver 18 comprises the sub-controller 28, a voltage converter 27, and the like. The sub-controller 28 of the high voltage driver 18 increases a DC voltage outputted from the battery 17 in the voltage converter 27 on the basis of a control signal (high voltage command) outputted from the main controller 16. The high voltage driver 18 supplies (outputs) the increased high voltage to the electrorheological damper 6 through the electrode pin 24A.

The sub-controller 28 is an ECU (Electronic Control Unit) of the high voltage driver 18 and comprises, for example, a microcomputer. In such a case, the sub-controller 28 includes a memory comprising a flash memory, a ROM, a RAM, an EEPROM, and the like and an arithmetic circuit (CPU). The memory stores a program used for control processing of the voltage converter 27. The memory further stores, for example, a processing program for outputting to the main controller 16 a signal (ground information) indicating accordingly when the cylinder (external cylinder 9) of the electrorheological damper 6 and the ground are disconnected, and other like programs.

The sub-controller 28 is also called as a satellite controller or a satellite ECU (Satellite ECU). The sub-controller 28 is connected to the main controller 16 through a vehicle data bus 23. The vehicle data bus 23 is, for example, an in-vehicle communicable communication cable that is called an L-CAN (Local CAN). The vehicle data bus 23 thus forms a CAN (Controller Area Network) functioning as a serial communication portion that is a network necessary for data communication. In this case, the vehicle data bus 23 connects the main controller 16 and the sub-controller 28.

The vehicle data bus 23 transfers (sends) a control signal (namely, a high voltage command corresponding to the damping force to be outputted by the electrorheological damper 6) from the main controller 16 to the sub-controller 28. In response to the control signal (high voltage command) transferred from the main controller 16, the sub-controller 28 supplies the control voltage to the electrode pin 24A and controls the damping force of the electrorheological damper 6. When the cylinder (external cylinder 9) of the electrorheological damper 6 and the ground are disconnected, the sub-controller 28 outputs a signal (ground information) indicating accordingly to the main controller 16 through the vehicle data bus 23.

FIG. 1 shows a configuration in which the signals (acceleration signals) outputted from the acceleration sensors 14 and 15 are entered directly in the main controller 16. However, the configuration is not limited to the foregoing. The main controller 16 may obtain the vehicle behavior information (acceleration signals) through another vehicle data bus, not shown, instead of the vehicle data bus 23. The another vehicle data bus may be, for example, an in-vehicle communication cable (the another vehicle data bus) called a V-CAN (Vehicle CAN) which is communicable with various ECUs including a steering system ECU, a braking system ECU, and other like ECUs, which are installed in the vehicle. FIG. 1 depicts the input and output of the high voltage command and the input and output of the ground information by separate lines. This does not mean that the data (signals) are transferred through separate communication cables, but FIG. 1 shows the separate lines for a clear distinction between the input side and the output side. The aforementioned data (signals) can be transferred (sent and received) through the vehicle data bus 23 (a communication cable).

Figure 3:
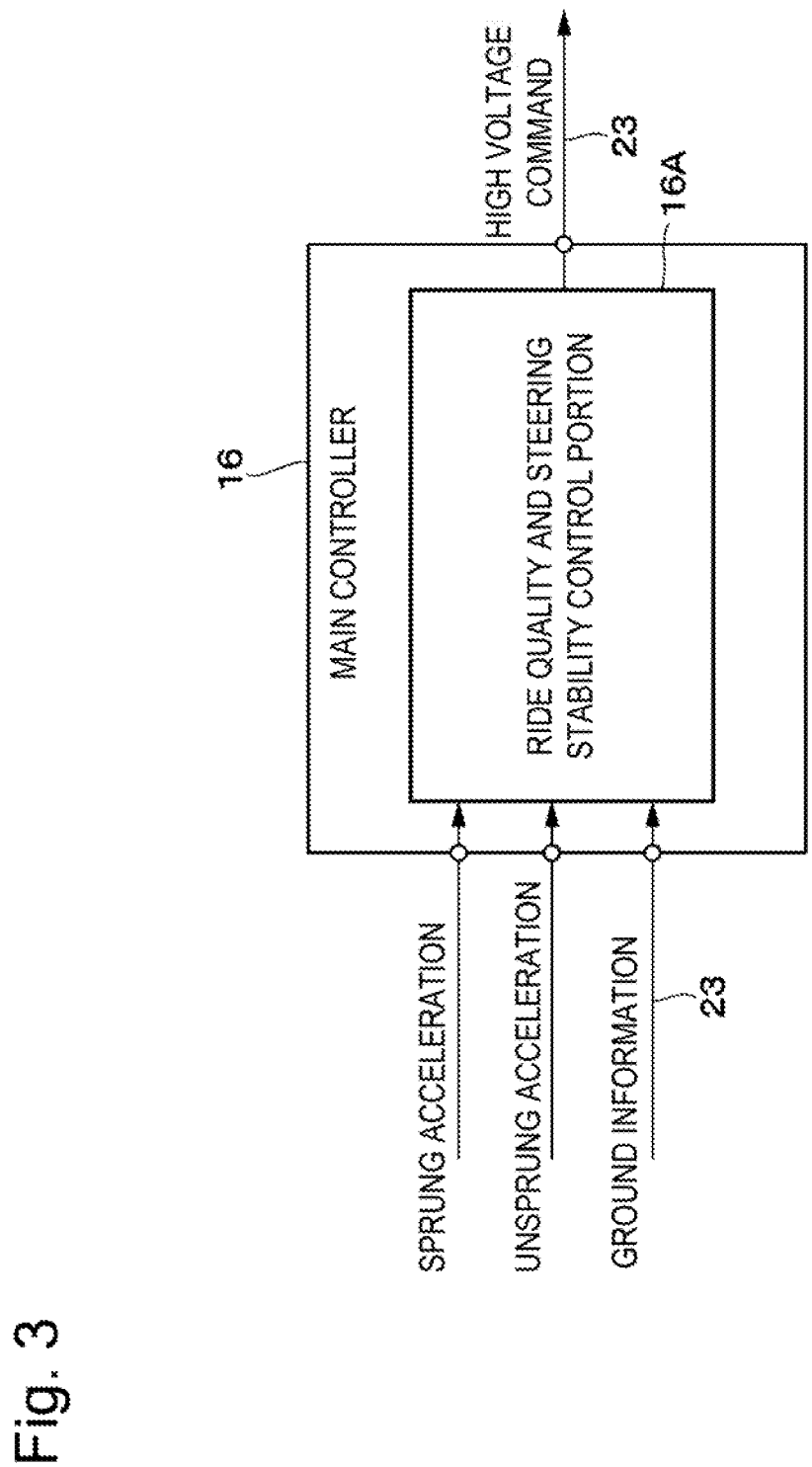
FIG. 3 is a block diagram of a main controller illustrated in FIG. 1.

The following discussion explains the main controller 16 that implements the control processing of the electrorheological damper 6 with reference to FIG. 3 in addition to FIGS. 1 and 2.

The main controller 16 is a controller configured to control the voltage applied to the electrorheological damper 6. That is, the main controller 16 is a controller configured to output the high voltage command for controlling the voltage applied to the electrorheological damper 6 to the sub-controller 28 of the high voltage driver 18. As illustrated in FIG. 3, the main controller 16 comprises a ride quality and steering stability control portion 16A. The main controller 16 includes a memory comprising, for example, a flash memory, a ROM, a RAM, an EEPROM, and the like, in addition to a computing unit (CPU), all not shown. The memory stores, for example, a processing program for computing the damping force to be outputted by the electrorheological damper 6 (target voltage value to be applied to the electrorheological damper 6) and other like programs.

An input side of the ride quality and steering stability control portion 16A is connected to the sprung acceleration sensor 14 and the unsprung acceleration sensor 15. An output side of the ride quality and steering stability control portion 16A is connected to the sub-controller 28 of the high voltage driver 18. The sprung acceleration from the sprung acceleration sensor 14 and the unsprung acceleration from the unsprung acceleration sensor 15 are entered in the ride quality and steering stability control portion 16A. The ride quality and steering stability control portion 16A calculates the vehicle behavior using the sprung acceleration and the unsprung acceleration. To improve the ride quality and the steering stability, the ride quality and steering stability control portion 16A computes a target damping force, for example, using a skyhook control law and calculates the target voltage value so that the target damping force is generated. The ride quality and steering stability control portion 16A outputs to the sub-controller 28 the calculated target voltage value as a high voltage command (high voltage command signal).

The control law for calculating the target damping force may be feedback control, such as optimum control and H∞ control, instead of the skyhook control. Although the target damping force is used as the control command, a target damping coefficient may be used, instead of the target damping force. When the cylinder (external cylinder 9) of the electrorheological damper 6 and the ground are disconnected, for example, by detaching the high voltage driver 18 from the electrorheological damper 6 or by other causes, the ground information (ground signal) indicating that the cylinder of the electrorheological damper 6 is ungrounded is entered in the ride quality and steering stability control portion 16A from the sub-controller 28 of the high voltage driver 18. In this instance, the ride quality and steering stability control portion 16A, for example, can set the target voltage value to zero.

The high voltage driver 18 that develops (generates) the high voltage is discussed below with reference to FIG. 4 in addition to FIGS. 1 to 3.

The high voltage driver 18 increases the voltage in the voltage converter 27 and outputs the increased voltage to (the electrode cylinder 12 of) the electrorheological damper 6 according to the control command (control signal) of the sub-controller 28 based on the high voltage command outputted from the main controller 16. In other words, the high voltage driver 18 generates the high voltage applied to (the electrode cylinder 12 of) the electrorheological damper 6 in the voltage converter 27 according to the control command of the sub-controller 28. The high voltage generated in the voltage converter 27 is applied to the electrode cylinder 12 of the electrorheological damper 6 through the electrode pin 24A.

The high voltage is applied to the electrode (electrode cylinder 12) of the electrorheological damper 6. It is therefore not preferable that the high voltage is applied to the electrode (electrode cylinder 12) of the electrorheological damper 6 while the cylinder (external cylinder 9) of the electrorheological damper 6 and the ground (GND) are disconnected from each other. According to the embodiment, the high voltage driver 18 is detachably attached to the electrorheological damper 6 to supply the voltage necessary for performance of the electrorheological damper 6. If the high voltage driver 18 is not attached to the electrorheological damper 6, it is necessary to prevent the electrorheological pin 24A from developing a high voltage. According to the embodiment, therefore, the high voltage driver 18 is configured as below.

As illustrated in FIG. 4, the high voltage driver 18 comprises a connecting portion 24, the voltage converter 27 as the voltage generating portion, the sub-controller 28 as the controller, a pull-up resistor 29, and an NOR gate 30 that is also called as an NOR circuit. The connecting portion 24 electrically connects the voltage converter 27 of the high voltage driver 18 and the electrorheological damper 6. The connecting portion 24 connects the high voltage driver 18 and the electrorheological damper 6 in a mountable/demountable (that is, attachable/detachable or insertable/removable) manner. To this end, the connecting portion 24 has the electrode pin 24A functioning as an electrode connecting portion, a ground pin 24B as a ground connecting portion, and a ground detection pin 24C as a ground detection connecting portion.

The electrode pin 24A electrically connects (a positive terminal of) the voltage converter 27 and the electrode cylinder 12 of the electrorheological damper 6. The electrode pin 24A is fixed to the high voltage driver 18 side and is attachable (connectable) to and detachable (disconnectable) from (the electrode cylinder 12 of) the electrorheological damper 6. The electrode pin 24A is connected to (the positive terminal of) the voltage converter 27 through the high voltage output cable 21 at one end side located on the high voltage driver 18 side and connected directly to the electrode cylinder 12 at the other end side located on the electrorheological damper 6 side.

Although omitted from the attached drawings, the other end side of the electrode pin 24A, for example, may be connected to the electrode cylinder 12 through another member (a conductive member that is a separate component from the electrode pin 24A and the electrode cylinder 12) connected to the electrode cylinder 12 (that is, a conductive member for electrically connecting the electrode pin 24A and the electrode cylinder 12 may be disposed therebetween). The electrode pin 24A may be a pillar-like (convex) male pin or a cylindrical (concave) female pin.

The ground pin 24B electrically connects the external cylinder 9 of the electrorheological damper 6 and the ground (or more specifically, a negative terminal (GND) of the voltage converter 27). The ground pin 24B is fixed to the high voltage driver 18 side and is attachable (connectable) to and detachable (disconnectable) from (the external cylinder 9 of) the electrorheological damper 6. The ground pin 24B is connected to the ground through the grounding cable 22 and the negative terminal (GND) of the voltage converter 27 at one end side located on the high voltage driver 18 side and connected directly to the external cylinder 9 at the other end side located on the electrorheological damper 6 side.

Although omitted from the attached drawings, the other end side of the ground pin 24B, for example, may be connected to the external cylinder 9 through another member (a conductive member that is a separate component from the electrode pin 24B and the external cylinder 9) connected to the external cylinder 9 (that is, a conductive member for electrically connecting the electrode pin 24B and the external cylinder 9 may be disposed therebetween). The one end side of the ground pin 24B may be connected to the ground without the voltage converter 27. The ground pin 24B may be a pillar-like (convex) male pin or a cylindrical (concave) female pin.

The ground detection pin 24C is disposed separately from the ground pin 24B. The ground detection pin 24C is electrically connected to the ground (or more specifically, the negative terminal (GND) of the voltage converter 27) through the external cylinder 9 of the electrorheological damper 6 and the ground pin 24B. The ground detection pin 24C is fixed to the high voltage driver 18 side and is attachable (connectable) to and detachable (disconnectable) from (the external cylinder 9 of) the electrorheological damper 6. The ground detection pin 24C is connected to one input side of the NOR gate 30 through a ground detection line 25 at one end side located on the high voltage driver 18 side. That is, the one end side of the ground detection pin 24C is connected to (an enabling signal input portion 27A of) the voltage converter 27 through the ground detection line 25 and the NOR gate 30. The one end side of the ground detection pin 24C is connected to the sub-controller 28 through the ground detection line 25 and a branch line 26 diverging from the ground detection line 25.

The other end side (electrorheological damper 6 side) of the ground detection pin 24C is connected directly to the external cylinder 9. In such a case, as FIG. 4 illustrates an electric pathway 51 with a virtual line (chain double-dashed line), the other end side of the ground detection pin 24C is electrically connected to the ground pin 24B through the conductive external cylinder 9. In other words, the other end side of the ground detection pin 24C is connected to the ground through the external cylinder 9 (electric pathway 51), the ground pin 24B, the grounding cable 22, and the negative terminal (GND) of the voltage converter 27.

Although omitted from the attached drawings, the other end side of the ground detection pin 24C may be connected to the external cylinder 9, for example, through another member (a conductive member that is a separate component from the ground detection pin 24C and the external cylinder 9) connected to the external cylinder 9 (that is, a conductive member for electrically connecting the ground detection pin 24C and the external cylinder 9 may be disposed therebetween). The ground detection pin 24C may be a pillar-like (convex) male pin or a cylindrical (concave) female pin.

The voltage converter 27 is the voltage generating portion that generates the voltage applied to the electrorheological damper 6. In other words, the voltage converter 27 increases and outputs the DC voltage of the battery 17 to the electrorheological damper 6. The voltage converter 27 is connected to the battery 17 through the battery cable 19 and the grounding cable 20. The voltage converter 27 is further connected to the electrode cylinder 12 of the electrorheological damper 6 through the high voltage output cable 21 and the electrode pin 24A and connected to the external cylinder 9 of the electrorheological damper 6 through the grounding cable 22 and the ground pin 24B. The control signal (control command) is entered in the voltage converter 27 from the sub-controller 28. In other words, the control signal corresponding to the high voltage to be applied to the electrode cylinder 12 of the electrorheological damper 6 is entered in the voltage converter 27 through the sub-controller 28. The voltage converter 27 increases the DC voltage of the battery 17 to the high voltage corresponding to the control signal and applies the high voltage to the electrode cylinder 12 through the high voltage output cable and the electrode pin 24A.

When the ground detection pin 24C and the ground are disconnected, the voltage converter 27 discontinues the voltage generation with or without the command (control signal) of the sub-controller 28. For example, if the ground detection pin 24C and the external cylinder 9 are disconnected or if the ground pin 24B and the external cylinder 9 are disconnected, the ground detection pin 24C and the ground are disconnected. Likewise, for example, if the grounding cable 22 or the grounding cable 20 is disconnected, the ground detection pin 24C and the ground are disconnected. In any of the aforementioned cases, the voltage converter 27 discontinues the voltage generation.

The voltage converter 27 is therefore provided with the enabling signal input portion 27A. An input side of the enabling signal input portion 27A is connected to an output side of the NOR gate that is a logic NOR circuit. The enabling signal input portion 27A enables the voltage generation by the voltage converter 27 (the voltage converter 27 generates a voltage) when an enabling signal (high-level signal, for example) is entered in the enabling signal input portion 27A from the NOR gate 30. When the enabling signal is not entered in the enabling signal input portion 27A from the NOR gate 30, that is, when a low-level signal (ground-level signal) is entered in the enabling signal input portion 27A from the NOR gate 30, the enabling signal input portion 27A discontinues (prohibits) the voltage generation (the voltage converter 27 does not generate a voltage).

As discussed later, when the ground detection pin 24C and the ground are connected, and the sub-controller 28 enables the voltage generation by the voltage converter 27, the enabling signal is entered in the enabling signal input portion 27A from the NOR gate 30. In contrast, when the ground detection pin 24C and the ground are disconnected, the enabling signal is not entered in the enabling signal input portion 27A from the NOR gate 30. When the sub-controller 28 does not enable the voltage generation by the voltage converter 27 (discontinues the voltage generation), the enabling signal is not entered in the enabling signal input portion 27A from the NOR gate 30.

The sub-controller 28 controls the voltage converter 27. More specifically, the sub-controller 28 controls the voltage converter 27 on the basis of the high voltage command outputted from the main controller 16, to thereby control the voltage applied to the electrorheological damper 6. The sub-controller 28 is connected to the main controller 16 through the vehicle data bus 23.

The sub-controller 28 comprises the microcomputer as mentioned. The memory of the sub-controller 28 stores, for example, a processing program for outputting to the main controller 16 a signal (ground information) indicating accordingly when the cylinder (external cylinder 9) of the electrorheological damper 6 and the ground are disconnected, in addition to a program used for control processing of the voltage converter 27. The sub-controller 28 outputs the control signal to the voltage converter 27 on the basis of the high voltage command outputted from the main controller 16 (ride quality and steering stability control portion 16A). The sub-controller 28 outputs to the voltage converter 27 a command (control signal) for generating the high voltage corresponding to the high voltage command outputted by the main controller 16 (ride quality and steering stability control portion 16A).

The sub-controller 28 is connected to the voltage converter 27 (at an output side) and further connected to the other input side of the NOR gate 30. The sub-controller 28 outputs the ground-level (low-level) signal to the other input side of the NOR gate 30 to enable the voltage generation by the voltage converter 27 and outputs the high-level signal to the other input side of the NOR gate 30 to discontinue the voltage generation by the voltage converter 27. The sub-controller 28 is allowed to output the high-level signal to the other input side of the NOR gate 30, for example, when a command to discontinue the voltage generation is entered in the sub-controller 28 from the main controller 16.

The sub-controller 28 is connected to the ground detection pin 24C (at an input side) through the ground detection line 25 and the branch line 26. Connected to the ground detection line 25 is a constant-voltage source (battery 17, for example) that applies a high-level voltage through the pull-up resistor 29. When the ground detection pin 24C and the ground are connected, therefore, the ground-level signal is entered in the sub-controller 28 through the ground detection line 25 and the branch line 26. In contrast, when the ground detection pin 24C and the ground are disconnected, the high-level signal is entered in the sub-controller 28 through the ground detection line 25 and the branch line 26. The sub-controller 28 is thus capable of judging whether the ground detection pin 24C and the ground are connected.

When the high-level signal is not entered in the sub-controller 28 through the ground detection line 25 and the branch line 26 (when the signal is low-level or ground-level), the sub-controller 28 judges that the ground detection pin 24C and the ground are connected. The sub-controller 28 then outputs the low-level (ground-level) signal to the other input side of the NOR gate 30. When the high-level signal is entered in the sub-controller 28 through the ground detection line 25 and the branch line 26, the sub-controller 28 judges that the ground detection pin 24C and the ground are disconnected. The sub-controller 28 then outputs the high-level signal to the other input side of the NOR gate 30.

The NOR gate 30 is disposed between the ground detection pin 24C and (the enabling signal input portion 27A of) the voltage converter 27 and between the sub-controller 28 and (the enabling signal input portion 27A of) the voltage converter 27. In other words, the ground detection pin 24C is connected to the one input side of the NOR gate 30 through the ground detection line 25.

The constant-voltage source (battery 17, for example) that applies the high-level voltage through the pull-up resistor 29 is connected to the ground detection line 25. When the ground detection pin 24C and the ground are connected, therefore, the ground-level (low-level) signal is entered in the one input side of the NOR gate 30 through the ground detection line 25. In contrast, when the ground detection pin 24C and the ground are disconnected, the high-level signal is entered in the one input side of the NOR gate 30 through the ground detection line 25.

Connected to the other input side of the NOR gate 30 is the sub-controller 28. When the sub-controller 28 enables the voltage generation by the voltage converter 27, the ground-level signal is entered in the other input side of the NOR gate 30. In contrast, when the sub-controller 28 discontinues the voltage generation by the voltage converter 27, the high-level signal is entered in the other input side of the NOR gate 30.

The NOR gate 30 outputs the enabling signal (high-level signal) to the enabling signal input portion 27A of the voltage converter 27 only when the ground-level (low-level) signal is entered from both the ground detection line 25 and the sub-controller 28. In other words, when the ground-level signal is entered in both the one input side and the other input side of the NOR gate 30, this corresponds to when the ground detection pin 24C and the ground are connected, and the sub-controller 28 enables the voltage generation by the voltage converter 27. At this time, the NOR gate 30 outputs the enabling signal (high-level signal) to the enabling signal input portion 27A of the voltage converter 27. In such a case, the high voltage generation by the voltage converter 27 is enabled, and the voltage converter 27 generates the high voltage.

When the high-level signal is entered in the one input side of the NOR gate 30 as a result of disconnection between the ground detection pin 24C and the ground, the NOR gate 30 discontinues the output of the enabling signal (high-level signal) to the enabling signal input portion 27A of the voltage converter 27 even if the sub-controller 28 enables the voltage generation by the voltage converter 27. The NOR gate 30 does not output the enabling signal to the enabling signal input portion 27A of the voltage converter 27 (the low-level signal (ground-level signal) is outputted). The voltage converter 27 is thus prohibited from generating a high voltage and discontinues the high voltage generation.

When the high-level signal in entered in the other input side of the NOR gate 30 so that the sub-controller 28 discontinues the voltage generation by the voltage converter 27, the NOR gate 30 discontinues the output of the enabling signal (high-level signal) to the enabling signal input portion 27A of the voltage converter 27 even if the ground detection pin 24C and the ground are connected. In this case, too, the voltage converter 27 is prohibited from generating a high voltage and therefore discontinues the high voltage generation.

According to the embodiment, for example, the electrode pin 24A, the ground pin 24B, and the ground detection pin 24C are set in length dimension so that when the electrode pin 24A, the ground pin 24B, and the ground detection pin 24C are disconnected, the ground detection pin 24C is first disconnected, followed by disconnection of the electrode pin 24A, and the ground pin 24B is then disconnected after the disconnection of the ground detection pin 24C and the electrode pin 24A. To put it the other way around, when the electrode pin 24A, the ground pin 24B, and the ground detection pin 24C are connected, the ground pin 24B is first connected, followed by connection of the electrode pin 24A, and the ground detection pin 24C is then connected after the connection of the ground pin 24B and the electrode pin 24A.

The electrode pin 24A, the ground pin 24B, and the ground detection pin 24C form a connection unit that is attachable to and detachable from (the electrode cylinder 12 and the external cylinder 9 of) the electrorheological damper 6. More specifically, the electrode pin 24A, the ground pin 24B, and the ground detection pin 24C form the high voltage driver 18 functioning as a voltage supply unit together with the voltage converter 27 and the sub-controller 28.

Dimensions of the portions (for example, dimension of the connecting side and the connected side, dimension of the convex side and the concave side, a length dimension of the convex side, a position of the convex side, a depth dimension of the concave side, a position of the concave side, and the like) are set so that when the high voltage driver 18 is detached from (the electrode cylinder 12 and the external cylinder 9 of) the electrorheological damper 6, the connection is disconnected in the order of (1), (2) and (3) as below. (1) The ground detection pin 24C and the cylinder (external cylinder 9) are disconnected. (2) The electrode pin 24A and the electrode (electrode cylinder 12) are disconnected. (3) The ground pin 24B and the cylinder (external cylinder 9) are disconnected.

As described above, the high voltage driver 18 includes two electronic hardware circuits and software corresponding to the electronic hardware circuits. One of the hardware circuits includes high voltage lines that can be disabled (deactivated). As for the other hardware circuit, the high voltage supply can be disabled (discontinued) by the sub-controller 28 (CPU). For example, when the high voltage driver 18 and the electrorheological damper 6 are disconnected, the voltage converter 27 is immediately deactivated. The foregoing function is most prioritized by the internal circuit (NOR gate 30) and cannot be avoided by the sub-controller 28. The function is carried out by an individual analog constituent element, and the circuit is arranged parallel to (in parallel with) the sub-controller 28. This makes it possible to ensure failsafe and robustness.

In other words, between the high voltage driver 18 and the electrorheological damper 6, there are disposed two ground connecting portions, namely, the ground pin 24B that is one of the ground connecting portions and the ground detection pin 24C that is the other ground connecting portion as well as the electrode pin 24A that is the electrode connecting portion. More specifically, a boundary surface of the high voltage driver 18 and the electrorheological damper 6, for example, the external cylinder 9 that is a housing of the electrorheological damper 6 is connected to the high voltage driver 18 through the two ground connecting portions (the ground pin 24B and the ground detection pin 24C). The connecting portions 24, namely, the electrode pin 24A, the ground pin 24B, and the ground detection pin 24C electrically connect (the electrode cylinder 12 and the external cylinder 9 of) the electrorheological damper 6 and (the voltage converter 27 of) the high voltage driver 18.

When the high voltage driver 18 is attached to the electrorheological damper 6 by mistake or when the high voltage driver 18 is detached from the electrorheological damper 6, if one of the ground connecting portions (the ground pin 24B and the ground detection pin 24C) is disconnected, the voltage converter 27 discontinues the high voltage generation. It is preferable that the connecting portions 24 are mechanically arranged, for example, so that when the high voltage driver 18 is detached from the electrorheological damper 6, the ground detection pin 24C is first disconnected, followed by disconnection of the electrode pin 24A, and the ground pin 24B is last disconnected. This allows residual capacity charge of the electrorheological damper 6 and of the high voltage driver 18 to be discharged in a prompt and safe manner. It is also possible through a mechanical design to allow the electrode pin 24A to be contacted (accessed) only after the ground detection pin 24C is disconnected.

The ground pin 24B is actually connected to the ground and carries a high voltage load current that flows from the electrorheological damper 6 to the high voltage driver 18. An electric current does not flow through the ground detection pin 24C. When both the ground pin 24B and the ground detection pin 24C are connected to the electrorheological damper 6, the ground detection pin 24C has the same potential (voltage) as the ground pin 24B and supplies the low-level signal (ground-level signal, 0V) to the two circuits (the NOR gate 30 and the sub-controller 28). When the high voltage driver 18 is detached from the electrorheological damper 6, a closed circuit between the ground pin 24B and the ground detection pin 24C is broken. The pull-up resistor 29 then increases the potential (voltage) of the circuit of the ground detection pin 24C to a high level. This signal (high-level signal) directly interrupts the voltage converter 27, causing the voltage converter 27 to discontinue the high voltage generation. At the same time, the signal (high-level signal) is supplied to the sub-controller 28 that cuts the high voltage using software. The NOR gate 30 ensures the detection of the ground detection pin 24C, which is carried out by both the hardware and the software, and the NOR gate 30 can swiftly suspend the high voltage generation using both the hardware and the software.

The suspension control apparatus according to the embodiment is thus configured. The following discussion explains processing for variably controlling the damping force characteristics of the electrorheological damper 6 using the main controller 16 and the high voltage driver 18.

While the vehicle travels, the detection signal corresponding to the sprung acceleration and the detection signal corresponding to the unsprung acceleration are entered in the main controller 16 from the sprung acceleration sensor 14 and the unsprung acceleration sensor 15, respectively. At this time, the ride quality and steering stability control portion 16A of the main controller 16 computes the target damping force using the skyhook control law or the like on the basis of the sprung acceleration and the unsprung acceleration and calculates the target voltage necessary for generating the target damping force. The main controller 16 then outputs the target damping force (target voltage) as the high voltage command to the sub-controller 28 of the high voltage driver 18.

The sub-controller 28 of the high voltage driver 18 increases the DC voltage outputted from the battery 17 in the voltage converter 27 on the basis of the high voltage command outputted from the main controller 16. Consequently, the voltage (high voltage) corresponding to the high voltage command is applied to the ERF 7 (outputted to the electrode cylinder 12 of the electrorheological damper 6), making it possible to control the viscosity of the ERF 7. The damping force characteristics of the electrorheological damper 6 become variable between the hard characteristic (thick characteristic) and the soft characteristic (thin characteristic) and are controlled in a continuous manner.

According to the embodiment, when the ground detection pin 24C and the ground are disconnected (for example, when the ground detection pin 24C and the external cylinder 9 are disconnected, when the ground pin 24B and the external cylinder 9 are disconnected or when the grounding cable 22 or the grounding cable 20 is disconnected), the voltage converter 27 discontinues the voltage generation with or without the command of the sub-controller 28. Therefore, even if a high voltage is applied from the voltage converter 27 to the electrode cylinder 12 of the electrorheological damper 6 through the electrode pin 24A, once the external cylinder 9 of the electrorheological damper 6 is ungrounded, the voltage converter 27 discontinues the voltage generation. This prevents the electrode cylinder 12 of the electrorheological damper 6 from being applied with a high voltage while the external cylinder 9 of the electrorheological damper 6 is ungrounded. If the ground detection pin 24C and the ground are disconnected when the high voltage driver 18 is detached from the electrorheological damper 6, the voltage converter 27 discontinues the voltage generation at the moment of the disconnection between the ground detection pin 24C and the ground. This reduces the possibility that, for example, a person who operates the electrorheological damper 6 touches the electrorheological damper 6 or electrode pin 24A applied with the voltage.

According to the embodiment, the voltage converter 27 is enabled to generate the voltage only when the ground-level signal is entered in the NOR gate 30 from both the ground detection line 25 and the sub-controller 28. When the external cylinder 9 of the electrorheological damper 6 is ungrounded, and therefore, the high-level voltage is entered through the ground detection line 25 to the NOR gate 30, the voltage converter 27 discontinues the voltage generation, which discontinues the voltage application to the electrode cylinder 12 of the electrorheological damper 6. When the high-level signal is entered in the NOR gate 30 from the sub-controller 28, the voltage driver 27 discontinues the voltage generation, which discontinues the voltage application to the electrode cylinder 12 of the electrorheological damper 6. The voltage application can be therefore discontinued by both "a circuit (hardware) for detecting that the electrorheological damper 6 is ungrounded" and "processing (software) performed by the sub-controller 28". This improves certainty of discontinuation of the voltage application.

According to the embodiment, when the connecting portions 24 are disconnected (that is, when the electrode pin 24A, the ground pin 24B, and the ground detection pin 24C are each disconnected), the ground detection pin 24C is disconnected before the electrode pin 24A is disconnected. More specifically, when the high voltage driver 18 is detached from the electrorheological damper 6, the connection between the ground detection pin 24C and the external cylinder 9 is disconnected before the connection between the electrode pin 24A and the electrode cylinder 12 is disconnected. In other words, the voltage converter 27 discontinues the voltage generation once the electrode pin 24A is disconnected. This allows the electrode cylinder 12 of the electrorheological damper 6 and the voltage converter 27 to be separated from each other (allows the electrorheological damper 6 and the high voltage driver 18 to be separated from each other) while the voltage generation of the voltage converter 27 is suspended (while the voltage application to the electrorheological damper 6 is suspended). This reduces the possibility that a person who performs maintenance for the electrorheological damper 6, which includes, for example, inspection, repair and replacement of the electrorheological damper 6, touches the electrorheological damper 6 and the electrode pin 24A, to which a voltage is applied. Moreover, the electrode pin 24A, the ground pin 24B, and the ground detection pin 24C can be collectively attached to/detached from (the electrode cylinder 12 and the external cylinder 9 of) the electrorheological damper 6, which facilitates the attachment/detachment work.

According to the embodiment, the connecting and disconnecting (insertion and removal) of the electrode pin 24A enables the connection and separation between the electrode pin 24A and the electrode cylinder 12; the connecting and disconnecting (insertion and removal) of the ground pin 24B enables the connection and separation between the ground pin 24B and the external cylinder 9; and the connecting and disconnecting (insertion and removal) of the ground detection pin 24C enables the connection and separation between the ground detection pin 24C and the external cylinder 9. This makes it possible to easily and reliably carry out the connection and separation.

The embodiment is discussed, taking as an example the case where the main controller 16 that calculates the high voltage command and the sub-controller 28 that controls the voltage converter 27 comprise the separate controllers. Instead, a main controller and a sub-controller may be integrally formed (may comprise a single controller).

The embodiment is discussed, taking as an example the case where the high voltage driver 18 includes the connecting portions 24 (the electrode pin 24A, the ground pin 24B, and the ground detection pin 24C), that is, the case where the sub-controller 28 and the voltage converter 27 form the voltage supply unit together with the connecting portions 24. Instead, for example, a sub-controller and a voltage converter may be configured separately from connecting portions. For example, a high voltage driver comprising a sub-controller and a voltage converter may be connected to connecting portions (an electrode pin, a ground pin, and a ground detection pin) with cables (electric wires), and the connecting portions provided at end portions of the cables may be connected to an electrorheological damper in an attachable/detachable manner. In other words, the connecting portions (the electrode pin, the ground pin, and the ground detection pin) may be connectors of wire harnesses connected to the electrorheological damper. In such a case, the detachment of the connectors (the disconnection of the connecting portions) may be carried out in such a manner that the electrode pin (electrode connecting portion) is disconnected after the ground detection pin (ground detection connecting portion) is disconnected, and the ground pin (ground connecting portion) is disconnected after the ground detection pin (ground detection connecting portion) and the electrode pin (electrode connecting portion) are disconnected.

The embodiment is discussed, taking as an example the case where the electrorheological damper 6 of the suspension device 4 is attached to the vehicle, such as an automobile, in a longitudinal position. The electrorheological damper 6, however, does not necessarily have to be attached to the vehicle in the longitudinal position. A shock absorber may be transversely attached to a vehicle, such as a rail vehicle. The electrorheological damper 6 may be arranged in a desired direction according to an object to which the electrorheological damper 6 is attached. For example, the electrorheological damper 6 is arranged in an inclined position without causing aeration.

For example, the following are possible modes of the suspension control apparatuses according to the above-discussed embodiments.

In a first mode, a suspension control apparatus comprises an electrorheological damper sealingly containing an electrorheological fluid varied in properties by electric field, the electrorheological damper being configured to adjust a damping force when a voltage is applied to the electrorheological fluid; a voltage generating portion configured to generate a voltage applied to the electrorheological damper; a connecting portion configured to connect the voltage generating portion and the electrorheological damper; and a controller configured to control the voltage generating portion. The electrorheological damper includes a cylinder sealingly containing the electrorheological fluid, a piston slidably inserted in the cylinder, a piston rod coupled to the piston and extending out of the cylinder, and an electrode disposed in a portion through which the electrorheological fluid flows due to a sliding motion of the piston in the cylinder, the electrode being configured to apply a voltage to the electrorheological fluid. The connecting portion comprises an electrode connecting portion that connects the voltage generating portion and the electrode, a ground connecting portion that connects the cylinder and ground, and a ground detection connecting portion disposed separately from the ground connecting portion and connected to the ground through the cylinder and the ground connecting portion. The voltage generating portion discontinues voltage generation with or without a command of the controller when the ground detection connecting portion and the ground are disconnected.

In the first mode, when the ground detection connecting portion and the ground (earth or body earth) are disconnected, the voltage generating portion discontinues the voltage generation with or without the command of the controller. Therefore, even if a high voltage is applied to the electrode of the electrorheological damper from the voltage generating portion, once the cylinder of the electrorheological damper is ungrounded, the voltage generating portion discontinues the voltage generation (the voltage stops being applied to the electrode of the electrorheological damper). This prevents the electrode of the electrorheological damper from being applied with a high voltage while the cylinder of the electrorheological damper is ungrounded.

In a second mode according to the first mode, the voltage generating portion includes an enabling signal input portion configured to enable the voltage generation when an enabling signal is entered and discontinue the voltage generation when the enabling signal is not entered. The enabling signal input portion is connected to an output side of an NOR gate. The ground detection connecting portion is connected to one input side of the NOR gate through a ground detection line. The ground detection line is connected through a pull-up resistor to a constant voltage source that applies a high-level voltage. The controller is connected to the other input side of the NOR gate. The controller outputs a ground-level signal to the other input side of the NOR gate to enable the voltage generation by the voltage generating portion and outputs a high-level signal to the other input side of the NOR gate to discontinue the voltage generation by the voltage generating portion. The NOR gate outputs the enabling signal to the enabling signal input portion only when the ground-level signal is entered in the NOR gate from both the ground detection line and the controller.

In the second mode, the voltage generation portion is enabled to generate the voltage only when the ground-level signal is entered in the NOR gate from both the ground detection line and the controller. When the cylinder of the electrorheological damper is ungrounded, and a high-level voltage is thus entered in the NOR gate through the ground detection line, the voltage generating portion discontinues the voltage generation, and the voltage stops being applied to the electrode of the electrorheological damper. When the high-level signal is entered in the NOR gate from the controller, the voltage generating portion discontinues the voltage generation, and the voltage stops being applied to the electrode of the electrorheological damper. The voltage application can be discontinued by both "a circuit (hardware) for detecting that the electrorheological damper is ungrounded" and "processing (software) performed by the controller". This improves certainty of discontinuation of the voltage application.

In a third mode according to the first mode, when the electrode connecting portion, the ground connecting portion, and the ground detection connecting portion are disconnected, the ground detection connecting portion is disconnected, followed by disconnection of the electrode connecting portion, and the ground connecting portion is disconnected after the disconnection of the ground detection connecting portion and the electrode connecting portion.

In the third mode, before the electrode connecting portion is disconnected, the ground detection connecting portion is disconnected. In other words, once the ground detection connecting portion is disconnected, the voltage generating portion discontinues the voltage generation. The electrode of the electrorheological damper and the voltage generating portion can be therefore separated while the voltage generation by the voltage generating portion is suspended. This reduces the possibility that a person who performs maintenance for the electrorheological damper, which includes, for example, inspection, repair and replacement of the electrorheological damper, touches the electrorheological damper and the electrode connecting portion, to which a voltage is applied.

In a fourth mode according to the first mode, the electrode connecting portion is an electrode pin connected to the electrode directly or through another member. The ground connecting portion is a ground pin connected to the cylinder directly or through another member. The ground detection connecting portion is a ground detection pin connected to the cylinder directly or through another member.

In the fourth mode, the connecting and disconnecting (insertion and removal) of the electrode pin enables the connection and separation between the electrode pin and the electrode; the connecting and disconnecting (insertion and removal) of the ground pin enables the connection and separation between the ground pin and the cylinder; and the connecting and disconnecting (insertion and removal) of the ground detection pin enables the connection and separation between the ground detection pin and the cylinder. This makes it possible to easily and reliably carry out the connection and separation.

In a fifth mode according to the fourth mode, the electrode pin, the ground pin, and the ground detection pin form a single voltage supply unit together with the voltage generating portion so as to be collectively attachable to/detachable from the electrode of the electrorheological damper and the cylinder. When the voltage supply unit is detached from the electrode of the electrorheological damper and the cylinder, the ground detection pin and the cylinder are disconnected, followed by disconnection between the electrode pin and the electrode, and the ground pin and the cylinder are disconnected after the disconnection of the ground detection pin and the electrode pin.

In the fifth mode, when the electrode pin, the ground pin, and the ground detection pin of the voltage supply unit are detached from the electrode of the electrorheological damper and the cylinder, the ground detection pin and the cylinder are disconnected before the electrode pin and the electrode are disconnected. In other words, once the ground detection pin and the cylinder are disconnected, the voltage generating portion discontinues the voltage generation. The electrorheological damper and the voltage supply unit can be therefore separated while the voltage application to the electrode of the electrorheological damper is suspended. This reduces the possibility that a person who performs maintenance for the electrorheological damper, which includes, for example, inspection, repair and replacement of the electrorheological damper, touches the electrorheological damper and the electrode connecting portion, to which a voltage is applied. Moreover, the electrode pin, the ground pin, and the ground detection pin can be collectively attached to/detached from the electrode of the electrorheological damper and the cylinder, which facilitates the attachment/detachment work.

The invention is not limited to the above-discussed embodiments and includes a variety of modification examples. For example, the embodiments are presented to facilitate the understanding of the invention and do not necessarily have to include all the above-mentioned configurations. The configuration of one of the embodiments may be partially replaced with or may be incorporated into the configuration of another one of the embodiments. The configuration of each embodiment may be partially incorporated with another configuration, omitted or replaced with another configuration.

The present application claims priority under Japanese Patent Application No. 2017-126113 filed on Jun. 28, 2017. The entire disclosure of Japanese Patent Application No. 2017-126113 filed on Jun. 28, 2017 including the description, claims, drawings and abstract, is incorporated herein by reference in its entirety.

REFERENCE SIGN LIST

6: electrorheological damper
7: ERF (electrorheological fluid)
8: internal cylinder (cylinder)
9: external cylinder (cylinder)
10: piston
11: piston rod
12: electrode cylinder (electrode)
18: high voltage driver (voltage supply unit)
24: connecting portion
24A: electrode pin (electrode connecting portion)
24B: ground pin (ground connecting pin)
24C: ground detection pin (ground detection connecting portion)
25: ground detection line
27: voltage converter (voltage generating portion)
28: sub-controller (controller)
29: pull-up resistor
30: NOR gate

The invention claimed is:

1. A suspension control apparatus comprising:
an electrorheological damper sealingly containing an electrorheological fluid that is varied in properties by electric field, the electrorheological damper being configured to adjust a damping force when a voltage is applied to the electrorheological fluid;
a voltage generating portion configured to generate a voltage applied to the electrorheological damper;
a connecting portion configured to connect the voltage generating portion and the electrorheological damper; and
a controller configured to control the voltage generating portion,
wherein the electrorheological damper includes:
a cylinder sealingly containing the electrorheological fluid;
a piston slidably inserted in the cylinder;
a piston rod coupled to the piston and extending out of the cylinder, and
an electrode disposed in a portion through which the electrorheological fluid flows due to a sliding motion of the piston in the cylinder, the electrode being configured to apply a voltage to the electrorheological fluid,
wherein the connecting portion includes:
an electrode connecting portion that connects the voltage generating portion and the electrode;
a ground connecting portion that connects the cylinder and ground; and
a ground detection connecting portion disposed separately from the ground connecting portion and connected to the ground through the cylinder and the ground connecting portion;
wherein the voltage generating portion discontinues the voltage generation with or without a command of the controller when the ground detection connecting portion and the ground are disconnected;
wherein the voltage generating portion includes an enabling signal input portion configured to enable the voltage generation when an enabling signal is entered in the voltage generating portion and discontinue the voltage generation when the enabling signal is not entered;
wherein the enabling signal input portion is connected to an output side of an NOR gate;
wherein the ground detection connecting portion is connected to one input side of the NOR gate through a ground detection line;
wherein the ground detection line is connected through a pull-up resistor to a constant voltage source that applies a high-level voltage;
wherein the controller is connected to the other input side of the NOR gate;
wherein the controller outputs a ground-level signal to the other input side of the NOR gate to enable the voltage generation by the voltage generating portion and outputs a high-level signal to the other input side of the NOR gate to discontinue the voltage generation by the voltage generating portion; and
wherein the NOR gate outputs the enabling signal to the enabling signal input portion only when the ground-level signal is entered in the NOR gate from both the ground detection line and the controller.

2. The suspension control apparatus according to claim 1, wherein the electrode connecting portion is an electrode pin connected to the electrode directly or through another member;
wherein the ground connecting portion is a ground pin connected to the cylinder directly or through another member, and
wherein the ground detection connecting portion is a ground detection pin connected to the cylinder directly or through another member.

3. The suspension control apparatus according to claim 2, wherein the electrode pin, the ground pin, and the ground detection pin form a single voltage supply unit together with the voltage generating portion so as to be collectively attachable to/detachable from the electrode of the electrorheological damper and the cylinder, and
wherein when the voltage supply unit is detached from the electrode of the electrorheological damper and the cylinder, the ground detection pin and the cylinder are first disconnected, followed by disconnection between the electrode pin and the electrode, and the ground pin and the cylinder are disconnected after the disconnection of the ground detection pin and the electrode pin.

4. A suspension control apparatus comprising:
an electrorheological damper sealingly containing an electrorheological fluid that is varied in properties by electric field, the electrorheological damper being configured to adjust a damping force when a voltage is applied to the electrorheological fluid;
a voltage generating portion configured to generate a voltage applied to the electrorheological damper;

a connecting portion configured to connect the voltage generating portion and the electrorheological damper; and a controller configured to control the voltage generating portion, wherein the electrorheological damper includes:

a cylinder sealingly containing the electrorheological fluid;

a piston slidably inserted in the cylinder;

a piston rod coupled to the piston and extending out of the cylinder, and an electrode disposed in a portion through which the electrorheological fluid flows due to a sliding motion of the piston in the cylinder, the electrode being configured to apply a voltage to the electrorheological fluid, wherein the connecting portion includes:

an electrode connecting portion that connects the voltage generating portion and the electrode;

a ground connecting portion that connects the cylinder and ground; and a ground detection connecting portion disposed separately from the ground connecting portion and connected to the ground through the cylinder and the ground connecting portion, wherein the voltage generating portion discontinues the voltage generation with or without a command of the controller when the ground detection connecting portion and the ground are disconnected, and wherein when the electrode connecting portion, the ground connecting portion, and the ground detection connecting portion are disconnected, the ground detection connecting portion is first disconnected, followed by disconnection of the electrode connecting portion, and the ground connecting portion is then disconnected after the disconnection of the ground detection connecting portion and the electrode connecting portion.

* * * * *